Oct. 6, 1936.    M. A. EDWARDS    2,056,348
CONTROL SYSTEM
Filed Dec. 21, 1935
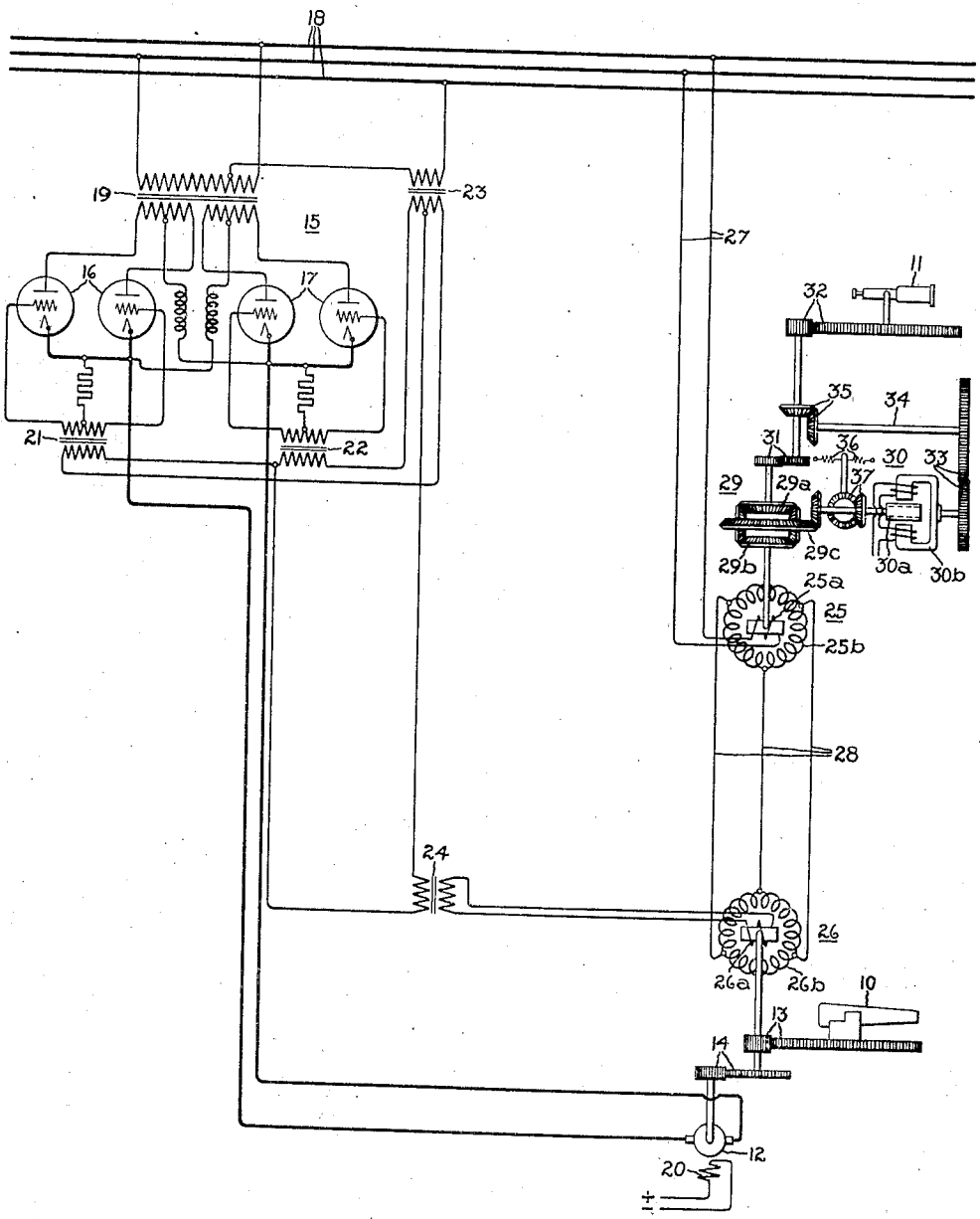
Inventor:
Martin A. Edwards,
by Harry E. Dunham
His Attorney.

Patented Oct. 6, 1936

2,056,348

UNITED STATES PATENT OFFICE 2,056,348

CONTROL SYSTEM

Martin A. Edwards, Schenectady, N. Y., assignor to General Electric Company, a corporation of New York Application December 21, 1935, Serial No. 55,595

5 Claims. (Cl. 172—239)

This invention relates to control systems, more particularly to the class of control systems known as follow-up control systems, and it has for an object the provision of a simple, reliable, accurate and improved control system of this character.

If a heavy or massive object is to be driven in correspondence with a light, easily movable pilot device, the control system is often referred to as a "torque amplifier" because a much greater torque is required to move the object than is required to move the pilot device. In systems of this character, means are provided for driving the driven object, and a power control is provided for controlling the supply of power to the driving means. The power control element is influenced differentially by the motion of the pilot device and driven object. This power control may be thought of as a throttle or valve, the opening of which determines the amount of power to be supplied to the driving means. Assuming the power control element to be in the form of a valve, either electrical or mechanical, full speed of the driven object requires full opening of the power control. This opening may be represented by an angle, which in a typical case, may be 1° of movement of the control element. This full opening for full speed operation is brought about by the driven object lagging the pilot device by an angle which may also, in a typical case, be assumed to be 1°. Thus, at full speed there is an error of 1°. This error is usually referred to as the dynamic accuracy. An opening of the power control of .1° is usually sufficient to move the driven object slowly from one position to another. Under this condition, there would be a velocity lag error of only .1°. At standstill the accuracy is even less than .1°. This accuracy is known as the static accuracy of correspondence. An important object of this invention is the provision of means for producing a dynamic accuracy equivalent to the static accuracy.

In carrying the invention into effect in one form thereof, means are provided for driving the driven object, and an electrical transmitting device actuated by the pilot device and an electrical receiving device connected to the driven object are provided for controlling the driving means to drive the driven object toward a position of correspondence with the pilot device at a velocity substantially that of the pilot device, but lagging the position of the pilot device by an amount dependent upon the velocity. In order to eliminate this "velocity lag" a differential device is included in the connection between the pilot device and transmitting device, and a torque motor, preferably an eddy current motor, connected to the pilot device actuates the differential device an amount dependent upon the velocity of the pilot device, thereby to effect an advance in the position of the driven object a proportional amount.

This invention is an improvement of the invention of Ernst F. W. Alexanderson disclosed in application Serial No. 41,580, filed September 21, 1935, and assigned to the assignee of the present invention.

In illustrating the invention in one form thereof, it is shown as embodied in a remote control system for causing a gun to reproduce the movement and position of a sighting telescope, but it will be understood, of course, that the control system has other uses and applications in industry.

For a better and more complete understanding of the invention reference should now be had to the following specification and to the accompanying drawing, the single figure of which is a simple diagrammatical representation of an embodiment of the invention.

Referring now to the drawing, an object such as a gun 10 is to be rotated in train in correspondence with a sighting telescope or director 11 so as accurately to reproduce the movements and positions of the director. The gun 10 is driven by any suitable driving means, such for example, as the direct current electric motor 12 to whose drive shaft the gun mounting platform is connected by suitable reduction gearing 13, 14. Direct current is supplied to the armature of this motor by any suitable means such for example, as the electric valve apparatus 15, illustrated as comprising a pair of electric valves 16 for supplying direct current in one direction to the armature of the motor 12 and a second pair of valves 17 for supplying direct current to the armature in the reverse direction. The electric valves in turn are supplied from a suitable source of alternating voltage represented by the three supply lines 18, through a suitable supply transformer 19, the primary winding of which is connected to the middle and upper supply lines and the secondary windings of which are connected to the anodes of the four valves as illustrated. The direct current motor 12 is provided with a separately excited field winding 20 which is supplied from any suitable separate source of direct current such as that represented by the plus and minus signs.

Although the electric valves may be of any suitable type, they are preferably of the three-electrode type having a small quantity of an inert gas introduced into the envelope after exhaust. This inert gas may be mercury vapor or any other suitable gas and it serves to convert the usual pure electronic discharge into arc stream, thereby constituting the valve a grid controlled arc rectifier.

The average value of the current flowing in the anode circuit of electric valves of this character can be controlled by varying the phase relationship between the voltages applied to the grids and to the anodes, respectively. When the grid voltage is substantially in phase with the anode voltage, the current flowing in the anode circuit is maximum, and when the grid voltage is lagging with respect to the anode voltage by a predetermined amount, usually more than 90°, the current flowing in the anode circuit is a minimum or substantially zero. For intermediate phase relationships, the current flow has corresponding intermediate values.

Alternating voltage is supplied to the grids of the electric valves 16 and 17 by means of grid transformers 21 and 22, respectively, the primary windings of which are connected in series relationship with the secondary winding of a grid biasing transformer 23, one of the terminals of whose primary winding is connected to an intermediate point of the primary winding of the supply transformer 19 and whose other terminal is connected to the lower supply line 18. This connection of the primary winding of the biasing transformer serves to derive a voltage for the grid or input circuit of the electric valve apparatus which is more than 90° lagging with respect to the anode voltage, so that both pairs of valves are held at cut-off and therefore supply no current to the armature of the motor 12.

For the purpose of varying this phase relationship of the grid and anode voltages, a component voltage is supplied to the grid or input circuit through a transformer 24, one terminal of whose secondary winding is connected to the common point between the primary windings of the grid transformers 21 and 22 and whose opposite terminal is connected to an intermediate point of the secondary winding of the biasing transformer 23. This component voltage is derived from the middle and upper supply lines 18 and is therefore substantially in phase with the anode voltage of one pair of valves and, therefore, substantially 180° out of phase with the anode voltage of the other pair of valves. Thus it will be seen that by varying the magnitude of this component voltage, the phase relationship of the resultant grid voltage, i. e., the vectoral sum of the component voltage and the grid bias voltage may be varied as desired and likewise, the magnitude of the current and voltage supplied to the electric motor 12 is correspondingly varied. It will also be seen, that by reversing the polarity of this component voltage and varying its magnitude, the opposite pair of valves will be energized to supply current to the electric motor, also having a value dependent upon the magnitude of the component voltage. For the purpose of varying the magniture of the component voltage, suitable rotary induction apparatus actuated differentially by the director 11 and the gun 10 is provided. This rotary induction apparatus comprises an electrical transmitting device 25 and an electrical receiver regulating device 26.

The transmitting device 25 comprises a rotor member provided with a single circuit winding 25a and a stator member provided with a distributed poly-circuit winding 25b which is physically similar to the usual three-phase winding of an alternating current dynamo-electric machine. As indicated, the single circuit rotor winding 25a is connected by means of conductors 27 to the upper and middle supply lines 18. The receiver-regulator 26 is in all respects identical with the transmitting device 25, having a single circuit rotor winding 26a and a distributed polycircuit stator winding 26b. However, the rotor winding of the receiver is connected to the primary winding of the transformer 24 and the terminals of the stator winding are connected by means of conductors 28 to corresponding terminals of the stator winding of the transmitting device 25.

The rotor winding of the transmitter 25, when energized, produces an alternating magnetic field by means of which a voltage is induced in the stator winding, thereby causing currents to flow in the stator winding of the receiver 26. These currents in the stator winding produce an alternating magnetic field by means of which a voltage is induced in the rotor winding of the receiver when the relationship between the axis of the rotor winding and the axis of the magnetic field is other than 90°. When this 90° relationship obtains, no voltage is induced in the rotor winding and consequently no component voltage is supplied to the grid circuit of the electric valve apparatus, with the result that the system is de-energized and at rest.

For the purpose of advancing the position of the gun 10 an amount proportional to the velocity of the director 11, suitable means illustrated as a mechanical differential device 29 and a torque motor 30 are provided. One input member 29a of the differential device is connected through gearing 31 and 32 with the director and the output member 29b is mechanically connected to the rotor member of the transmitter 25. As shown, the torque motor comprises a driving member or rotor 30a mechanically connected to a second input member 29b of the differential device, and a driven member 30b connected through gearing 33, shaft 34, gearing 35 and 32 to the director. Suitable spring means 36 connected through beveled gearing 37 to the shaft of the driving member 30a serves to restore the input element 29b of the differential device to its normal position when the system is at rest.

With the above understanding of the apparatus and its organization in the completed system, the operation of the system itself will readily be understood from the following detailed description:

Rotation of the telescope 11 produces a corresponding rotation of the rotor member of the transmitter 25 and also a corresponding rotation of the axis of the magnetic field of the stator winding of the receiver 26. As a result of this change in the position of the magnetic field, a voltage is induced in the rotor winding of the receiver which is supplied as a component voltage to the grid circuit of the electric valve apparatus 15, thereby energizing the electric valve apparatus and causing one or the other pairs of valves to supply current to the electric motor 12 for rotation in a direction corresponding to the direction of rotation of the telescope 11. Since the rotor member of the receiver 26 is connected through gearing to the motor 12, the rotor member of the receiver is likewise rotated in a direction corresponding to the direction of rotation of the telescope. If the telescope is stopped, the motor 12 will finally drive the rotor member of the receiver to a position such that the axis of the rotor winding is at right angles to the magnetic field of the stator winding with the result that the component voltage is again reduced to zero, the electric valve apparatus 15 deenergized and the motor 12 brought to rest with the gun 10 in correspondence with the telescope.

During operation of the system, if the telescope 11 is being moved at a velocity equivalent to the maximum velocity at which the motor 12 can drive the gun 10, it will be clear that the rotor member of the receiver 26 must lag the rotor member of the transmitter 25 by an amount necessary to produce a component voltage sufficient to cause the electric valve apparatus to supply the voltage and current required to drive the motor 12 at maximum speed. For lesser speeds, the component voltage required is correspondingly less and therefore, the rotor of the receiver 26 will lag the rotor of the transmitter 25 by a correspondingly smaller angle. It will, therefore, be seen that the component voltage required to energize the electric valve apparatus to drive the gun at any velocity is substantially proportional to that velocity and that the rotor of the receiver 26 must therefore lag the rotor of the transmitter 25 by an angle proportional to velocity. And, it will also be seen that in the absence of the provision of any special means for preventing it, the gun 10 must lag the telescope 11 by an angle proportional to the velocity of the telescope. As previously pointed out, this would be undesirable and is prevented by advancing the rotor of the transmitter 25 an angle proportional to the velocity of the telescope 11. Since the driven member 30b of the eddy current motor is connected to the telescope 11, it is rotated at a velocity either equal to or proportional to the velocity of the telescope 11. Owing to the energized windings with which the driven member 30b is provided, eddy currents are induced in the rotor member which react with the magnetism of the driven member to produce a rotation of the rotor member. The springs 36 prevent the rotor member 30a from rotating continuously and consequently the amount of rotation is limited to an amount proportional to the torque developed by the eddy current motor, which torque is substantially proportional to the speed of the driven member 30b and therefore proportional to the velocity of the telescope 11. Since the input member 29c of the differential device is connected to the shaft of the eddy current motor, this input member is rotated through a limited angle proportional to the velocity of the telescope. The effect, therefore, is to advance the rotor of the transmitter 25 with respect to the telescope 11 by an amount proportional to the velocity of the telescope. The angle between the axis of the rotor member of the receiver and the axis of the stator winding is momentarily increased and this increases the component voltage supplied to the grid circuit of the electric valve apparatus, thereby increasing the voltage and current supplied to the motor 12 to produce an increase in the speed of the motor. The motor 12 will continue to operate at increased speed until the rotor member of the receiver 26 has caught up to the previous angle of lag with respect to the rotor member of the transmitter, i. e., the angle of lag necessary to produce rotation of the motor to drive the gun 10 at a velocity equal to that of the telescope. As this condition is approached, the component voltage supplied to the grid circuit of the electric valve apparatus is gradually reduced to its former value with the result that the speed of the motor is reduced to its former value and when this condition is finally reached, the motor 12 will continue to drive the gun 10 at a velocity equal to that of the telescope. The gun 10 and the rotor of the receiver, of course, continue to lag the rotor member of the transmitter 25 by an angle proportional to velocity, but since the rotor member of the transmitter 25 is advanced with respect to the telescope by an angle proportional to velocity, the gun 10 will be in substantial correspondence with the telescope and will remain in correspondence through the remaining movement of the telescope.

As the velocity of movement of the telescope 11 is gradually reduced preparatory to finally being trained on the target, the velocity of the driven member 30b of the torque motor is gradually reduced in like proportion. This, of course, produces a decrease in the torque exerted by the eddy current motor with the result that the springs 36 turn the input element 29c of the differential device backward toward its original position. When the telescope is finally brought to rest on the target, the speed of the eddy current motor and its torque are both zero, and consequently, the input element 29c of the differential device is completely restored to its initial position, and thus the velocity correction previously introduced is now completely subtracted from the system. The gun 10 is thus brought to rest in correspondence with the telescope.

Although in accordance with the provisions of the patent statutes this invention is described as embodied in concrete form it will be understood that the elements disclosed are merely illustrative and that the invention is not limited thereto since alteration and modification will readily suggest themselves to persons skilled in the art without departing from the true spirit of this invention or from the scope of the annexed claims.

What I claim as new and desire to secure by Letters Patent of the United States, is:—

1. A follow-up control system for a pilot device and driven object comprising driving means for said driven object, means responsive to positional disagreement of said device and object for controlling said driving means to drive said object toward a position of correspondence at a velocity proportional to said disagreement, and means for advancing the position of said object an amount proportional to said velocity comprising a differential device between said pilot device and control means and a torque motor connected to said pilot device for actuating said differential device.

2. Means for causing an object to move in positional agreement with a pilot device comprising driving means for said object, means responsive to positional disagreement of said pilot device and object for controlling said driving means to drive said object toward correspondence with said device comprising an electrical transmitting device connected to said pilot device and an electrical receiving device connected to said object, and means for advancing the position of said object to eliminate said disagreement comprising a differential device included in the connections between said pilot device and transmitting device and a torque motor driven by said pilot device for actuating an input member of said differential device an amount proportional to the velocity of said pilot device.

3. A follow-up control for a pilot device and driven object comprising an electric motor for driving said object, means responsive to positional disagreement of said device and object for controlling said motor to drive said object toward correspondence with said pilot device at a velocity proportional to said disagreement comprising an electrical transmitting device connected to said pilot device, an electrical receiving device connected to said object and electrical connections between said transmitting and receiving devices, and means for advancing the position of said object to eliminate disagreement comprising a mechanical differential device having an input member connected to said pilot device, an output member connected to said transmitting device and a second input member, and an eddy current motor having a driven member connected to said pilot device and a driving member connected to activate said second input member an amount proportional to the velocity of said pilot device.

4. Synchronizing apparatus for a pilot device and driven object comprising an electric motor for driving said object, apparatus for controlling the supply of power to said motor having an output circuit connected to said motor and an input control circuit, means responsive to positional disagreement of said device and object for energizing said apparatus to cause said motor to drive said object toward correspondence with said device at a velocity proportional to said disagreement comprising an electrical transmitting device connected to said pilot device, a receiver regulating device connected to said object and electrical connections between said transmitting and regulating devices, and means for advancing the position of said object an amount substantially equal to said disagreement comprising a mechanical differential device having an input member connected to said pilot device, an output member connected to said transmitting device and a second input member, and an eddy current motor having a driven member connected to said pilot device and a driving member connected to said second input member of said differential device.

5. A follow-up control system for a pilot device and driven object comprising an electric motor for driving said object, means for controlling the supply of power to said motor comprising electric valve apparatus having an output circuit connected to said motor and an input control circuit, means responsive to positional disagreement of said pilot device and driven object for energizing said valve apparatus to cause said motor to drive said object toward correspondence with said device at a velocity proportional to said disagreement comprising an electrical transmitting device connected to said pilot device, a receiver regulating device mechanically connected to said object and electrically connected to said control circuit and electrical connections between said transmitting and regulating devices, a mechanical differential device having an output element connected to said transmitting device, an input element connected to said pilot device, and a second input element, and an eddy current motor having a driven member connected to said pilot device and a driving member connected to said second input element to advance said transmitting device an amount proportional to the velocity of said pilot device, thereby substantially to eliminate said positional disagreement.

MARTIN A. EDWARDS.

DISCLAIMER 2,056,348.—*Martin A. Edwards*, Schenectady, N. Y. CONTROL SYSTEM. Patent dated October 6, 1936. Disclaimer filed February 6, 1937, by the assignee, *General Electric Company*.

Hereby enters this disclaimer to claim 1 of said Letters Patent.

[*Official Gazette March 2, 1937*.]